United States Patent [19]

McKenzie et al.

[11] Patent Number: 4,752,394
[45] Date of Patent: Jun. 21, 1988

[54] BORE SCREEN

[75] Inventors: Alexander T. McKenzie, Cronulla; Vaughan Dobbyns, Lindfield, both of Australia

[73] Assignee: Loadarm Australia Pty. Limited, Kurnell, Australia

[21] Appl. No.: 936,147

[22] Filed: Dec. 1, 1986

[30] Foreign Application Priority Data

Jan. 7, 1986 [AU] Australia .............................. PH04119

[51] Int. Cl.⁴ ...................... B01D 29/46; B01D 35/02; B01D 3/20
[52] U.S. Cl. ..................................... 210/488; 166/235
[58] Field of Search ............... 210/488, 314, 498, 521; 166/235

[56] References Cited

U.S. PATENT DOCUMENTS

| | | | |
|---|---|---|---|
| 1,705,848 | 3/1929 | Austin | 166/235 |
| 2,004,071 | 6/1935 | Hannesschlager | 166/235 |
| 3,568,842 | 3/1971 | Bozek | 210/488 |
| 3,822,744 | 7/1974 | Reijonen et al. | 166/235 |

FOREIGN PATENT DOCUMENTS 234285 6/1961 Australia .............................. 166/235

Primary Examiner—Richard V. Fisher
Assistant Examiner—Richard D. Jordan
Attorney, Agent, or Firm—Abelman Frayne Rezac & Schwab

[57] ABSTRACT

A bore screen for use in filtering fluids which are extracted from bores or wells and which comprises a stack of annular plastics material rings which are clamped together in face-to-face relationship. Each ring is formed on opposite, first and second, faces with aligned, circumferentially spaced bearing pads, the bearing pads on the first face of successive rings contacting those on the second face of adjacent rings and serving to space the rings apart. The bearing pads on the first face of each ring are formed with stepped projections and those which are on the second face of each ring are formed with complementary stepped recesses, and the bearing pads mate in such a way that the spacing between adjacent rings is changed as one ring is rotated relative to another and different pairs of bearing pads are brought into contact with one another.

9 Claims, 4 Drawing Sheets

BORE SCREEN

FIELD OF THE INVENTION

This invention relates to bore screens for use in filtering fluids such as water, oil and gas which are extracted from bores or wells.

BACKGROUND OF THE INVENTION

Various types of bore screens have been developed to date; including slotted casing, wire mesh, perforated sheet metal and wire wrapped screens. These screens exhibit individual merits and demerits, but one feature which is common to all is that a given screen cannot be adjusted to accommodate different particle size ranges. This means that differently sized screens must be constructed and carried in stock to suit various conditions.

Of all the prior art bore screens, the wire wrapped screen is considered generally to offer the best features. This screen comprises a cylindrical body which is constructed as a metal cage and around which a wedge-profile wire is wrapped. A continuous length of the wire is wound onto the cage and successive convolutions of the wire are welded to the cage. The space between each pair of convolutions is constant on any one screen but it may be varied from screen-to-screen to accommodate different particle sizes.

Whilst the wire wrapped screen is deemed to be the most suitable for most situations, it is more expensive than other types of screens and, as previously mentioned, it cannot be adjusted on site to provide for screening of different particle sizes.

A bore screen which was developed to overcome this problem is disclosed in Australian patent Specification No. 234285, dated Dec. 15, 1959, and, as described, it comprises a slotted metal cylinder around which a plurality of plastics material annular rings are stacked and clamped. Each ring is formed on one face with a plurality of cylindrical projections, and on its other face with three times as many cylindrical recesses. The recesses are located on the same pitch circle diameter as the projections, but the angle between adjacent projections is three times greater than that which exists between adjacent recesses. When one ring is stacked upon another, the projections of one ring locate within every third recess in the other. Thus, the rings are stacked to form a cylindrical structure and the rings, which extend about a common axis, are spaced from one another by the projections on each ring bottoming in recesses in each adjacent ring.

A special feature of this screen is that, while all of the projections on each of the rings have the same length, each recess has one of three possible depths and every third recess has the same depth. As a consequence, when one ring is turned about the common axis and relative to an adjacent ring, the space between the two rings is varied, and this feature permits a given screen construction to be used in different situations where various particle sizes may be encountered.

However, a problem which exists in relation to the above described screen is that the projections bottom only in every third recess and with such broadly spaced support between the rings, the rings tend to distort and assume a wavy form when clamped together. This in turn results in non-uniform and unpredictable spacing between the rings.

SUMMARY OF THE INVENTION

The present invention seeks to avoid the above problem by providing a screen which is constructed from stacked rings, with the space between the rings being adjustable, but one in which the rings may be interfitted and be clamped without distortion of the rings being induced.

Thus, the present invention provides a bore screen comprising a plurality of rings which are stacked upon one another in face-to-face relationship, which extend about a common longitudinal axis and which are clamped together. Each ring is formed on opposite, first and second, faces with circumferentially spaced bearing pads. The bearing pads on the first face of successive rings contact the bearing pads on the second face of adjacent rings and serve to space the rings apart. The bearing pads on one face of each ring are formed with stepped projections and the bearing pads on the opposite face of each ring are formed with stepped recesses. Also, the stepped projections and the stepped recesses associated with respective ones of the bearing pads are configured differently from the stepped projections and stepped recesses associated with others of the bearing pads whereby the spacing between adjacent rings is changed as one ring is rotated relative to another and different pairs of bearing pads are brought into contact with one another. The bearing pads that are formed with stepped projections are complementary to the bearing pads that are formed with stepped recesses whereby a portion of each bearing pad which is formed with a stepped projection bears against a portion of the aligned bearing pad which is formed with a stepped recess.

PREFERRED FEATURES OF THE INVENTION

The rings may be polygonal but they preferably are annular and identical so that, when stacked, they form a hollow cylindrical screen. The lower end of the stack is in use fitted with a blanking member, which may be in the form of a plate, and a coupling element is fitted to the upper end of the stack so that it may be connected to a fluid pump line.

The bearing pads on the first and second face of each ring preferably are aligned and are equi-angularly diposed about a common circumferential line. Also, a hole preferably extends through each of the aligned bearing pads for receiving a fastening element which is used for clamping the stack of rings together.

The fastening elements which are used for clamping the rings together may also be used for securing the blanking element and the coupling element to the stack.

The stepped projections and stepped recesses which constitute the bearing pads preferably are formed as concentric stepped rings which are disposed about the fastening element receiving holes.

It is preferred that all the bearing pads on the first face are formed with stepped projections and that all the bearing pads formed on the second face are formed with stepped recesses, although it is possible to have bearing pads with a stepped projection and bearing pads with a stepped recess on each face of the rings.

The rings preferably are moulded from plastics material although they may be cast or otherwise formed from metal if so required. Also, the rings preferably are tapered or, in other words, wedge-shaped such that the thickness of each ring reduces from the outside edge to the inner edge of the ring.

Each ring may be formed on each of its faces with four bearing pads, two of which have one configuration and the other two of which have another configuration. With such an arrangement, adjacent rings may be spaced apart by one of two possible distances. However, each ring preferably is formed on each of its faces with six bearing pads, two of which having one configuration, another two of which having a second configuration and the remaining two of which having a third configuration. This arrangement provides for three possible spacings for the rings in the stack.

Many other possible arrangements may be provided but, in every case, each face of each ring will be formed with the same number of bearing pads and the total number of pads will be a multiple of the number of different spacings required between the rings.

The invention will be more fully understood from the following description of a preferred embodiment of a screen, the description being provided with reference to the accompanying drawings.

DETAILED DESCRIPTION OF THE INVENTION

Figure 1:
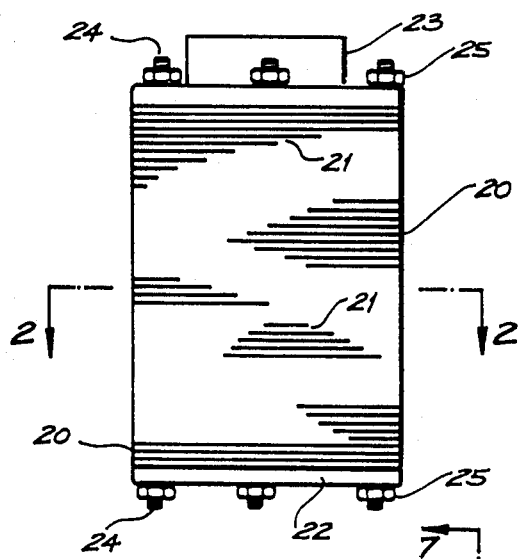
FIG. 1 shows on a reduced scale a side elevation view of a complete bore screen.
Figure 2:
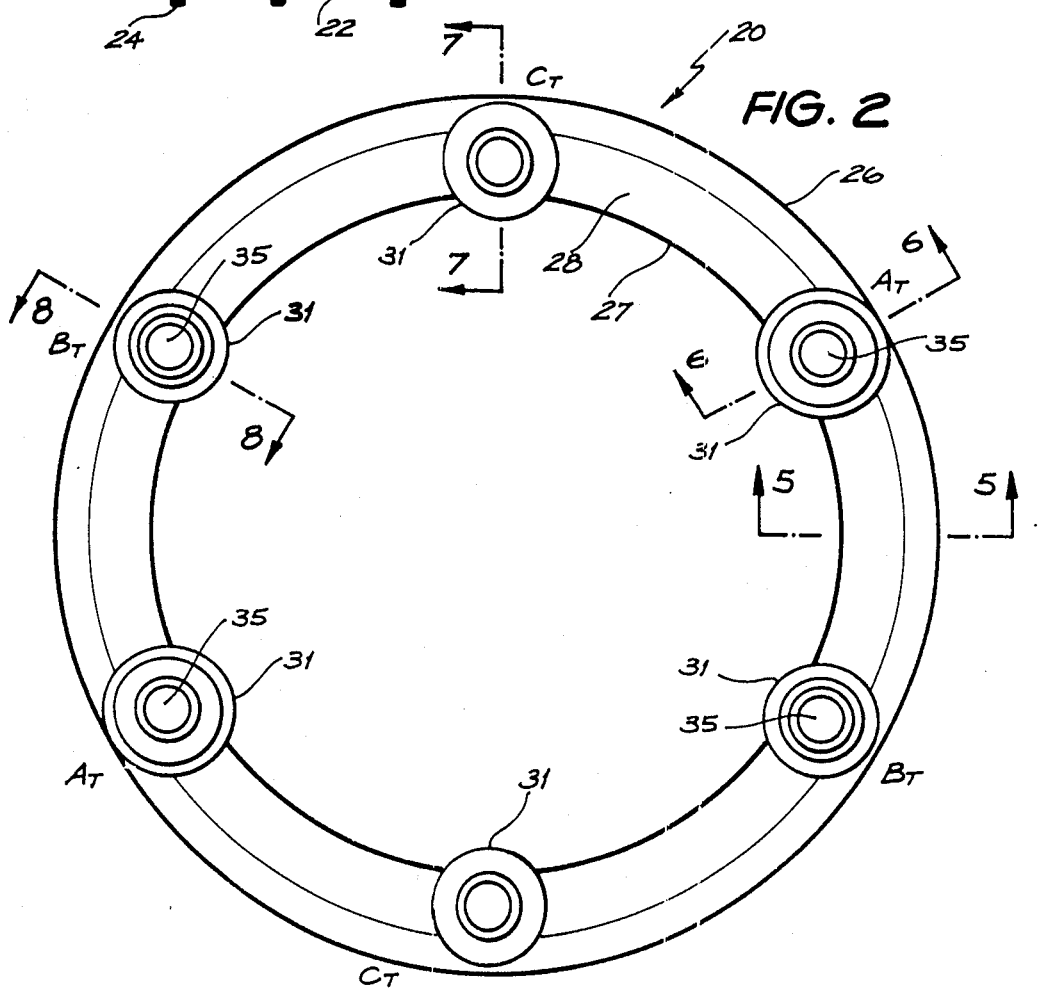
FIG. 2 shows a plan view of one ring of the screen, as viewed in the direction of section plane 2—2 shown in FIG. 1.

As illustrated in FIG. 1, the bore screen comprises a stack of rings 20, each of which is formed from a plastics material such as glass-fibre reinforced polypropylene. The rings are all identical and they are spaced apart by a small gap 21 through which fluid may flow to enter the interior of the screen from the outside. The distance by which the rings are spaced-apart is selected to meet the filtering requirements of different bores and, in the embodiment to be described, adjacent rings may be spaced apart by any one of three different distances. All of the rings may be spaced apart by the same distance or the spacing may be varied throughout the stack.

The number of rings in the stack will be determined by the rate at which fluid is required to flow through the screen and, thus, on the required total effective area of all of the spaces through which the fluid may pass.

The stack of rings is clamped together between a lower blanking plate 22 and an upper coupling 23 which is connectable to a fluid line. Six studs 24 extend through the stack of rings and are fitted with washers and nuts 25 for clamping the entire stack to form a solid cylindrical body.

As shown in FIGS. 2 to 5, each ring 20 has an outer peripheral edge 26, an inner edge 27, a top face 28 and a bottom face 29. The outer region of the top and bottom faces is tapered or wedge shaped as indicated by the numeral 30 in FIGS. 4 and 5.

Both the top and the bottom face 28 and 29 are formed with six aligned bosses or, as referred to herein, bearing pads 31 and 32. The bearing pads are generally cylindrical in outline and, as best seen from FIGS. 6 to 8, the bearing pads 31 which are formed on the top face 28 of each ring incorporate stepped projections 33 whilst the bearing pads 32 which are formed on the lower face 29 of each ring incorporate stepped recesses 34. A hole 35 extends through the centre of each bearing pad for receiving the clamping studs 24.

The bearing pads 31 on the top face of each ring contact and locate in the bearing pads 32 at the bottom face of adjacent rings. Thus, the stepped projections 33 locate in the stepped recesses 34 and, when the rings are stacked, the only contact between adjacent rings is by way of the bearing pads.

Of the six bearing pads 31 in the top face of each ring, two of the pads (identified by the letter $A_T$) have a first stepped configuration, another two (identified by the letter $B_T$) have a second stepped configuration and the final two (identified by letter $C_T$) have a third stepped configuration. The pairs of pads are diametrically disposed so that, in progressing clockwise around the ring, the bearing pads are arranged in order as $A_T B_T C_T A_T B_T C_T$.

Figure 3:
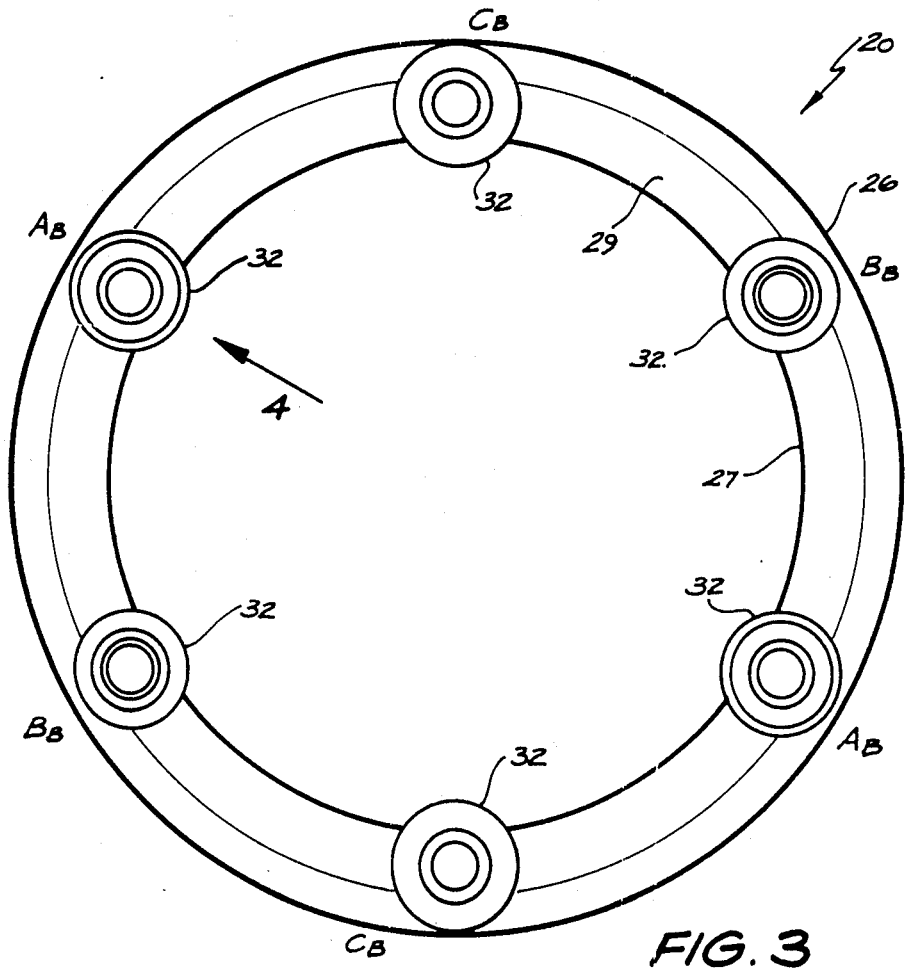
FIG. 3 shows an inverted plan view of the ring which is illustrated in FIG. 2.
Figure 4:
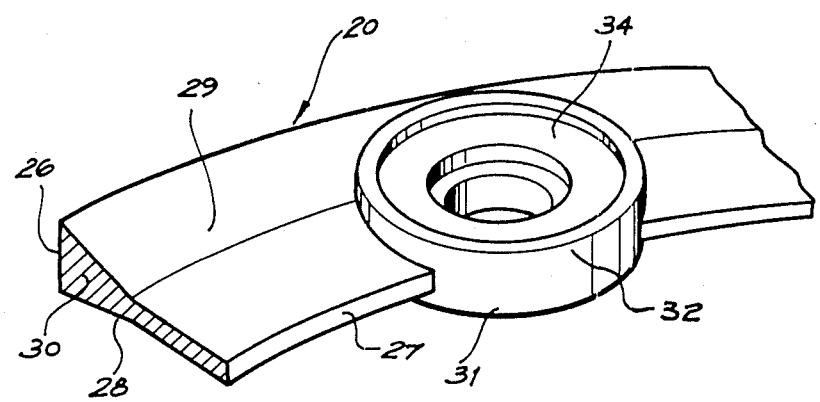
FIG. 4 shows a perspective view of that portion of the ring which is identified by the numeral 4 in FIG. 3.
Figure 5:
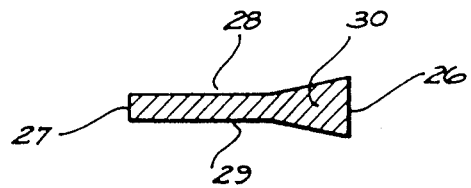
FIGS. 5, 6, 7 and 8 show sectional elevation views of the ring which is shown in FIGS. 2 and 3, the views being taken in the direction of section planes 5—5, 6—6, 7—7 and 8—8 shown in FIG. 2.

The bearing pads 32 on the bottom face of each ring are similarly arranged, with two of the pads ($A_B$) having a first step configuration, a further two of the pads ($B_B$) having a second configuration and the final pair ($C_B$) having a third configuration. In this case and as shown in FIG. 3, the bearing pads are arranged anticlockwise in order as $A_B B_B C_B A_B B_B C_B$.

Figure 6:
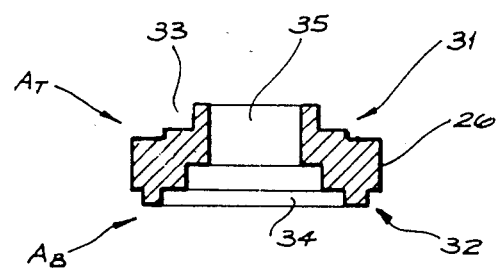
Figure 7:
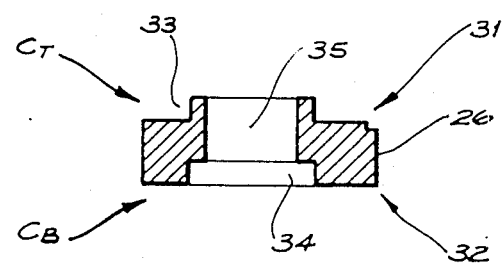
Figure 8:
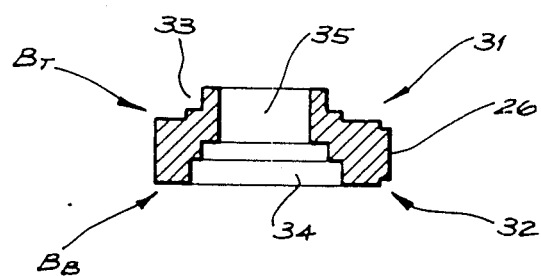

FIGS. 6, 7 and 8 show detailed sectional views of the respective bearing pads, from which it can be seen that the top pad $A_T$ is located above the bottom pad $A_B$. Similarly, the upper pads $B_T$ and $C_T$ are located above and are aligned with the lower pads $B_B$ and $C_B$ respectively.

Figure 9:
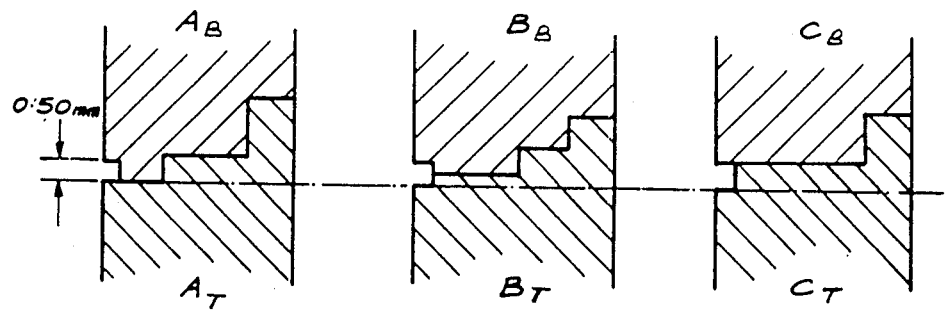
FIGS. 9, 10 and 11 each show three scrap views of bearing pads of two rings which are stacked to provide for required spacings between the rings.

Two rings may be stacked one upon the other such that the top bearing pads $A_T$, $B_T$ and $C_T$ in the lower ring engage with the bottom bearing pads $A_B$, $B_B$ and $C_B$ respectively in the upper ring. When this condition exists, the stepped projections and stepped recesses 33 and 34 contact one another in the manner shown in FIG. 9 and the rings will be spaced apart by a first distance, say, 0.50 mm.

Figure 10:
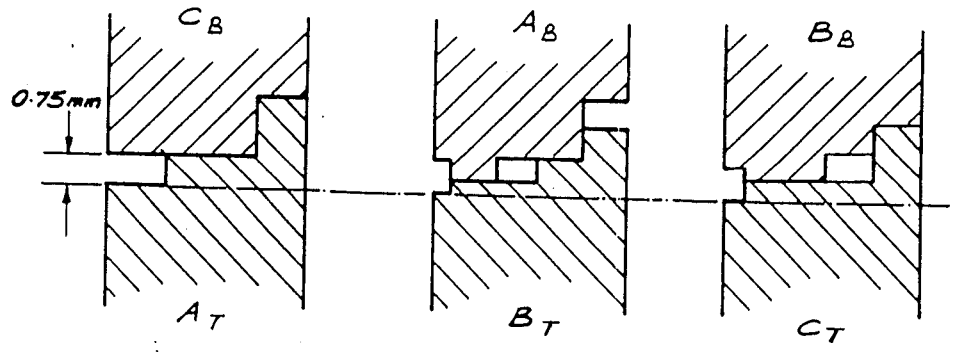

If one of the rings is then turned through 30° relative to the other, the bearing pads $A_T$, $B_T$ and $C_T$ in the lower ring will then engage with the bearing pads $C_B$, $A_B$ and $B_B$ respectively in the upper ring. This condition results in contact between the stepped projections and recesses as shown in FIG. 10 and the rings will be spaced apart by a second distance, say, 0.75 mm.

Figure 11:
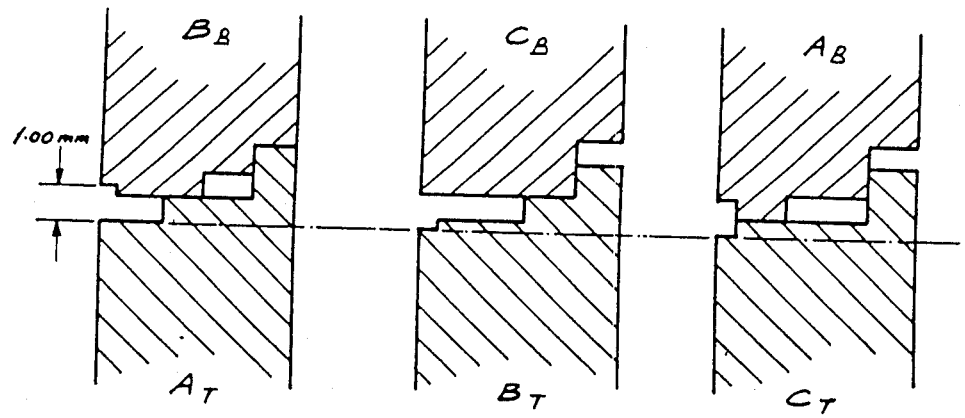

Then, if one of the rings is turned through a further 30° relatively to the other, the bearing pads $A_T$, $B_T$ and $C_T$ in the lower ring will engage with the bearing pads $B_B$, $C_B$ and $A_B$, respectively, in the upper ring. This further rotation will result in contact between the stepped projections and recesses as shown in FIG. 11 and the rings will be spaced apart by a third distance, say, 1.0 mm.

Thus, by utilising the stepped projections and recesses in configuring the bearing pads, the rings may be turned relative to one another to effect a change in the gap between the rings. Moreover, contact is maintained between the respective bearing pads whatever may be the rotational relationship of the rings.

We claim:

1. A bore screen which compromises a plurality of rings which are stacked upon one another in spaced-apart face-to-face relationship, and which extend about a common longitudinal axis; a plurality of circumferentially spaced bearing pads integrally formed on opposite first and second faces of each ring, the bearing pads on the first face of each ring being aligned with the bearing pads on the second face of each ring; the bearing pads on the first face of successive ones of the rings contacting respective ones of the bearing pads on the second face of adjacent rings and the bearing pads serving to space the rings apart in the longitudinal direction whereby fluid may flow between the rings to enter and be extracted from an interior region of the screen; the bearing pads on the first face of each ring being formed with stepped projections and the bearing pads on the second face of each ring being formed with stepped recesses which are configured to bear against the stepped projections of contacting said bearing pads; the stepped projections and the stepped recesses associated with respective ones of the bearing pads being configured differently from the stepped projections and stepped recesses associated with others of the bearing pads whereby the spacing between adjacent said rings is changed as one ring is rotated relative to another and different pairs of bearing pads are brought into contact with one another; and apertures extending through the aligned pairs of bearing pads in each ring and arranged to receive fastening elements which serve to clamp the rings against one another with the rings stacked to provide a predetermined space between adjacent ones of the rings.

2. The bore screen as claimed in claim 1, wherein the rings are annular and, when stacked, form a hollow cylinder.

3. The bore screen as claimed in claim 1 wherein the stepped projections and stepped recesses are formed as concentric stepped rings which are disposed about the fastening element receiving apertures.

4. The bore screen as claimed in claim 1, wherein the rings are wedge-shaped such that the thickness of each ring reduces from an outer marginal edge of the ring to an inner marginal edge of the ring.

5. The bore screen as claimed in claim 1 wherein a blanking member is fitted to one end of the stack and a coupling member is fitted to the other end of the stack to enable coupling to a fluid pump line, the blanking member and the coupling member being secured to the stack by means of the fastening elements.

6. The bore screen as claimed in claim 1, wherein the bearing pads on the first and second faces of each ring are equi-angularly disposed around a common circumferential line.

7. The bore screen as claimed in claim 6 wherein six said bearing pads are formed on each of the first and second faces of each ring, those on the first face being aligned with those on the second face of the ring.

8. The bore screen as claimed in claim 7 wherein first, second and third diametrically opposed pairs of the bearing pads on the first face of each ring are formed with stepped projections which respectively have first, second and third configurations, and wherein first, second and third diametrically opposed pairs of the bearing pads on the second face of each ring are formed with stepped recesses which respectively have first, second and third configurations, whereby the stacking of the rings may be arranged to provide for any one of three different spacings between adjacent ones of the rings.

9. The bore screen as claimed in claim 1 wherein each ring is formed from a plastics material.

* * * * *